US009109505B2

(12) United States Patent
Ulrey et al.

(10) Patent No.: US 9,109,505 B2
(45) Date of Patent: Aug. 18, 2015

(54) METHODS AND SYSTEMS FOR CONDENSATION CONTROL

(71) Applicant: Ford Global Technologies, LLC, Dearborn, MI (US)

(72) Inventors: Joseph Norman Ulrey, Dearborn, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 13/965,751

(22) Filed: Aug. 13, 2013

(65) Prior Publication Data

US 2015/0047340 A1  Feb. 19, 2015

(51) Int. Cl.
F02D 23/00 (2006.01)
F02B 47/08 (2006.01)
F02M 25/07 (2006.01)
F02D 41/00 (2006.01)

(52) U.S. Cl.
CPC ............ *F02B 47/08* (2013.01); *F02D 41/0047* (2013.01); *F02M 25/07* (2013.01); *F02M 25/071* (2013.01); *F02M 25/0709* (2013.01); *F02M 25/0727* (2013.01)

(58) Field of Classification Search
CPC ......... F01P 2060/02; F01P 3/20; F01P 7/165; F02B 29/0475; F02B 33/44; F02D 2200/0414; F02D 41/0065; F02M 25/07; F02M 25/0707; F02M 25/0713; F02M 25/0728; F02M 25/0729; F02M 25/0754; F02M 25/0793

USPC ............................... 123/559.1–566, 200–249
See application file for complete search history.

(56) References Cited

U.S. PATENT DOCUMENTS

| 3,614,259 A | 10/1971 | Neff |
| 4,351,154 A | 9/1982 | Richter |
| 4,389,845 A | 6/1983 | Koike |
| 4,443,153 A | 4/1984 | Dibelius |
| 4,544,326 A | 10/1985 | Nishiguchi et al. |
| 4,949,276 A | 8/1990 | Staroselsky et al. |
| 6,079,210 A | 6/2000 | Pintauro et al. |

(Continued)

FOREIGN PATENT DOCUMENTS

| EP | 0435357 A1 | 7/1991 |
| EP | 2317111 A1 | 5/2001 |

(Continued)

OTHER PUBLICATIONS

Ulrey, Joseph Norman et al., "Methods and Systems for Boost Control," U.S. Appl. No. 13/965,901, filed Aug. 13, 2013, 54 pages.

(Continued)

Primary Examiner — Jesse Bogue
(74) Attorney, Agent, or Firm — Julia Voutyras; Alleman Hall McCoy Russell & Tuttle LLP

(57) ABSTRACT

Methods and systems are provided for reducing condensate accumulation at a charge air cooler (CAC) during cold ambient conditions. A wastegate may be held closed while a compressor recirculation valve is held open during an engine cold start so as to use compressor heating and increased compressor recirculation to expedite CAC heating. EGR delivery is delayed until the CAC is sufficiently warm to reduce the propensity for condensation.

17 Claims, 4 Drawing Sheets

(56) References Cited

U.S. PATENT DOCUMENTS

| | | | |
|---|---|---|---|
| 6,408,833 B1 | 6/2002 | Faletti | |
| 6,565,479 B2 | 5/2003 | Fattic et al. | |
| 6,681,171 B2 | 1/2004 | Rimnac et al. | |
| 6,725,847 B2 | 4/2004 | Brunemann et al. | |
| 6,983,596 B2 | 1/2006 | Frankenstein et al. | |
| 7,137,253 B2 | 11/2006 | Furman et al. | |
| 7,163,005 B2 | 1/2007 | Tussing et al. | |
| 7,640,744 B2 | 1/2010 | Rollinger et al. | |
| 8,161,746 B2 | 4/2012 | Ulrey et al. | |
| 8,267,069 B2 | 9/2012 | Hsia et al. | |
| 8,286,616 B2 | 10/2012 | Clarke et al. | |
| 8,287,233 B2 | 10/2012 | Chen | |
| 8,333,071 B2 | 12/2012 | Oakley et al. | |
| 8,601,813 B2 | 12/2013 | Shutty et al. | |
| 2003/0114978 A1* | 6/2003 | Rimnac et al. | 701/108 |
| 2006/0196182 A1 | 9/2006 | Kimoto et al. | |
| 2008/0163855 A1 | 7/2008 | Matthews et al. | |
| 2009/0050117 A1* | 2/2009 | Tai et al. | 123/542 |
| 2009/0071150 A1 | 3/2009 | Joergl et al. | |
| 2009/0271094 A1 | 10/2009 | Stablein et al. | |
| 2010/0043428 A1* | 2/2010 | Stablein et al. | 60/602 |
| 2011/0023842 A1 | 2/2011 | Kurtz | |
| 2011/0056199 A1* | 3/2011 | Gokhale et al. | 60/602 |
| 2011/0094480 A1 | 4/2011 | Suhocki et al. | |
| 2012/0014812 A1 | 1/2012 | Blaiklock et al. | |
| 2012/0090584 A1* | 4/2012 | Jung | 123/568.12 |
| 2012/0291762 A1 | 11/2012 | Vigild et al. | |
| 2012/0297765 A1 | 11/2012 | Vigild et al. | |
| 2013/0219886 A1* | 8/2013 | Koch et al. | 60/605.2 |
| 2014/0227109 A1* | 8/2014 | Wang et al. | 417/53 |
| 2014/0325979 A1* | 11/2014 | Morelli et al. | 60/599 |

FOREIGN PATENT DOCUMENTS

| | | | |
|---|---|---|---|
| EP | 1124047 A1 | 8/2001 | |
| EP | 2426340 A1 | 3/2012 | |
| EP | 2562397 A1 | 8/2012 | |

OTHER PUBLICATIONS

Banker, Adam Nathan et al., "Methods and Systems for Torque Control," U.S. Appl. No. 13/965,917, filed Aug. 13, 2013, 46 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

Jankovic, Mrdjan J. et al., "Methods and Systems for Boost Control," U.S. Appl. No. 13/829,648, filed Mar. 14, 2013, 39 pages.

Styles, Daniel Joseph et al., "Methods and Systems for Boost Control," U.S. Appl. No. 13/965,698, filed Aug. 13, 2013, 43 pages.

Buckland Julia Helen et al., "Methods and Systems for Surge Control," U.S. Appl. No. 13/965,725, filed Aug. 13, 2013, 38 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/965,794, filed Aug. 13, 2013, 56 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/966,006, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Method and System for Engine Control," U.S. Appl. No. 14/245,940, filed Apr. 4, 2014, 40 pages.

Ulrey, Joseph Norman et al., "Method and System for Engine Control," U.S. Appl. No. 14/245,945, filed Apr. 4, 2014, 57 pages.

Ulrey, Joseph Norman et al., "Method and System for Fuel Vapor Management," U.S. Appl. No. 13/660,884, filed Oct. 25, 2012, 38 pages.

\* cited by examiner

METHODS AND SYSTEMS FOR CONDENSATION CONTROL

FIELD

The present application relates to methods and systems for using compressive heating of intake air to speed warming of a charge air cooler.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. A charge air cooler (CAC) may be provided downstream of the compressor for cooling the boosted aircharge, thereby increasing the charge density, before it is delivered to the engine intake. As such, the charge air cooler may be coupled to a coolant loop that is distinct from, and not connected to, the engine coolant loop used to heat/cool the engine. Due to this separation, the charge air cooler may run at cooler temperatures (e.g., ambient temperatures) for extended durations. When EGR is introduced upstream of the charge air cooler, condensation can occur. When ingested, the condensate can cause misfires and NVH issues.

One approach to intermittently warm the CAC is taught by Vigild et al. in US 2012/0297765. Therein, the charge air cooler is fluidly connected to each of the engine cooling circuit and the CAC cooling circuit via a plurality of valve devices. By opening a first valve during a first set of conditions, the CAC cooling circuit is exposed to hotter coolant from the engine cooling circuit, enabling a periodic raising of the temperature of the CAC cooling circuit. In comparison, by opening a second valve during a second set of conditions, the CAC cooling circuit is exposed to cooler coolant from the CAC cooling circuit, enabling a lower temperature of the CAC cooling circuit to be maintained.

However the inventors herein have identified potential issues with such an approach. As one example, during cold start conditions, coolant temperatures in the engine cooling circuit may not be high enough to transfer sufficient heat to the CAC cooling circuit. During such conditions, the introduction of any EGR can lead to condensation build up at the CAC. While the CAC can be warmed using engine heat, it requires prior engine warm-up which can be slow during an engine cold-start. In addition, the approach of '765 requires the use of additional components, such as valves and fluid passages, which may increase cost and complexity of the system. Further still, turning off the cooling circuit pump limits heat transfer to the ambient.

Thus in one example, the above issues may be at least partly addressed by a method for a boosted engine comprising: closing a wastegate and an EGR valve while opening a compressor recirculation valve to heat a charge air cooler coupled downstream of a compressor responsive to cold conditions. In this way, transferring of turbine energy to the intake air may be used to warm the intake aircharge and increased compressor recirculation flow of the heated aircharge can be used to warm the charge air cooler.

For example, an engine system may include an intake compressor with a compressor bypass coupling an outlet of a downstream charge air cooler (CAC) to an inlet of the compressor. By adjusting the position of a compressor recirculation valve (CRV) in the compressor bypass, an amount of (cooled) compressed air may be recirculated from downstream of the CAC to the compressor inlet. The CAC may be coupled to a cooling circuit. The engine system may further include an exhaust turbine for driving the compressor, with a wastegate coupled in a bypass across the turbine. During cold conditions, such as when the CAC has been below a threshold temperature for an extended period of time, during an engine cold-start, or when ambient conditions are cold, an engine controller may actively close the wastegate to increase the exhaust pressure and spin the turbine. By recovering exhaust energy via the turbine and transferring energy to the intake air, the temperature of the CAC and the incoming intake air is increased. By simultaneously opening the CRV, the heated aircharge can be recirculated around the compressor and the CAC, thereby expediting warming the CAC. In addition, by increasing the recirculation of heated air across the CAC (via the CRV), heat transfer to the CAC (and the CAC cooling circuit) is increased without incurring a substantial increase in throttle inlet pressure.

An EGR valve may be maintained closed while the wastegate is closed and the CRV is opened so that the delivery of EGR is delayed until the CAC is sufficiently warm. Once the CAC temperature is above a threshold temperature, the EGR valve may be opened. By introducing EGR only after the CAC is sufficiently warm, the propensity for condensation and the associated issues are reduced. Increased delivery of low pressure EGR following warming of the CAC can be used to expedite engine heating. Specifically, as EGR is introduced, heat may be rejected by an EGR cooler to the engine cooling circuit to thereby warm up the engine.

In this way, exhaust heat may be recovered via a wastegate and added to a CAC during cold conditions to expedite warming of the CAC during cold engine conditions. By expediting warming of the CAC, EGR benefits can be achieved during low ambient conditions. By increasing the window for EGR operation without condensation, the overall fuel economy can be improved. By delaying introduction of EGR to a compressor inlet until the CAC has been warmed, EGR condensation is reduced. As such, this reduces the occurrence of misfires and other condensate ingestion related NVH issues.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
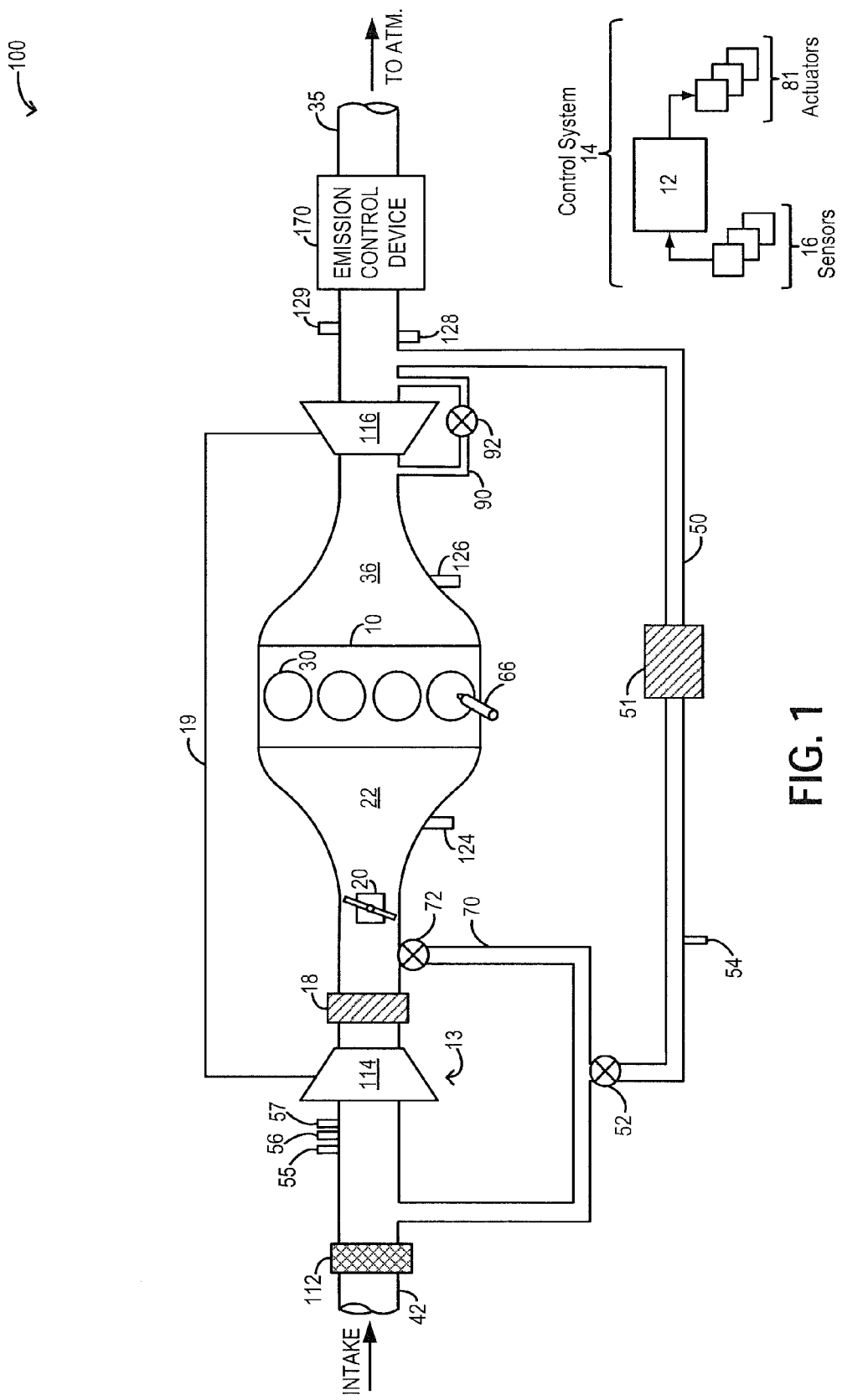
FIG. 1 shows an example embodiment of a boosted engine system.

Methods and systems are provided for recovering exhaust heat from an engine system, such as the engine system of FIG. 1, to warm charge flowing through a charge air cooler (CAC).

In doing so, intake aircharge and coolant flowing though the charge air cooler's cooling circuit (such as the circuit of FIG. 2), can be warmed. An engine controller may be configured to perform a control routine, such as the routine of FIG. 3, to recover exhaust heat by closing a wastegate during cold conditions to increase exhaust pressure and temperature upstream of a turbine. By raising the backpressure, work is extracted from the exhaust blow-down energy. Thus turbine power is transferred to the intake air via the compressor. By concurrently opening a compressor recirculation valve, the heated charge can be recirculated across the CAC, thereby warming the CAC cooling circuit. EGR delivery may be initiated once the CAC has been sufficiently warmed. An example adjustment is shown with reference to FIG. 4.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-water heat exchanger, for example. A detailed description of the cooling circuit coupled to the CAC is provided below with reference to FIG. 2. In the embodiment shown in FIG. 1, the pressure of the air charge within the intake manifold is sensed by manifold air pressure (MAP) sensor 124. Since flow through the compressor can heat the compressed air, a downstream CAC 18 is provided so that boosted intake aircharge can be cooled prior to delivery to the engine intake.

One or more sensors may be coupled to an inlet of compressor 114. For example, a temperature sensor 55 may be coupled to the inlet for measuring a compressor inlet temperature, and a pressure sensor 56 may be coupled to the inlet for measuring a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the aircharge compressed by compressor 114 may be recirculated to the compressor inlet. This allows excess boost pressure to be substantially immediately relieved. The compressor recirculation system may include a compressor recirculation passage 70 for recirculating cooled compressed air from the compressor outlet, downstream of charge-air cooler 18 to the compressor inlet. In some embodiments, an additional compressor recirculation passage (not shown) may be provided for recirculating un-cooled (or warm) compressed air from the compressor outlet, upstream of charge-air cooler 18 to the compressor inlet.

A compressor recirculation valve (CRV) 72 may be coupled to compressor recirculation passage 70 (also referred to as compressor bypass) to control an amount of cooled compressor flow recirculated to the compressor inlet. In the depicted example, CRV 72 may be configured as a continuously variable valve wherein a position of the valve is continuously variable from a fully closed position to a fully open position and any position there-between. CRV 72 may be positioned in passage 70, downstream of CAC 18 and upstream of an inlet of compressor 114. A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge. In either case, in response to an indication of surge (e.g., hard surge), the opening of the valve may be increased. A degree of opening of the CRV may be based on the indication of surge (e.g., the compressor ratio, the compressor flow rate, a pressure differential across the compressor, etc.). As one example, an opening of the CRV may be increased (e.g., the valve may be shifted from the fully-closed position or partially-open position to a fully-open position) in response to an indication of surge.

Surge may also be relieved by reducing exhaust pressure at turbine 116. For example, a wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

As elaborated herein, during selected conditions, the wastegate may be held closed to increase exhaust heat recovery. Specifically, during cold conditions, such as when the CAC has been below a threshold temperature for an extended period of time, during an engine cold-start, or when ambient conditions are cold, an engine controller may actively close the wastegate to increase the exhaust pressure and spin the turbine. The turbine power is transferred to the intake aircharge via the compressor. By simultaneously opening CRV 72, the heated aircharge can be recirculated around the compressor and the CAC, thereby warming the CAC. The increase aircharge temperature and increase recirculation of heated aircharge around the compressor leads to increased heat rejection at the CAC. As such, this expedites CAC and engine warming and improves engine performance.

Intake manifold 22 is coupled to a series of combustion chambers 30 through a series of intake valves (not shown).

The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. As such, EGR passage 50 couples the engine exhaust manifold, downstream of the turbine 116, with the engine intake manifold, upstream of compressor 114. In the depicted example, EGR passage 50 is shown merging with compressor recirculation passage 70 upstream of the compressor inlet. It will be appreciated that in alternate examples, the passages may not merge and the EGR passage may be coupled to the compressor inlet independent of the compressor recirculation passage.

EGR valve 52 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 52 may also be configured as a continuously variable valve. In an alternate example, however, EGR valve 52 may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution.

During cold CAC conditions, such as during an engine cold-start or when ambient conditions are cold, EGR received at the pre-compressor location may generate condensation due to the relatively high water content of EGR. When ingested in the engine, the condensate can lead to misfire events and NVH issues. As elaborated with reference to FIG. 3, during such conditions, the delivery of low pressure EGR may be delayed until the CAC has been sufficiently warmed. In addition, warming of the CAC may be expedited by closing the wastegate and recovering exhaust heat. In doing so, EGR can be provided even during low ambient conditions, extending the operating range over which EGR benefits can be attained.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 72, wastegate 92, and fuel injector 66. The control system 14 may include a controller 12. The controller may receive input data from the various sensors, process the input data, and trigger various actuators in response to the processed input data based on instruction or code programmed therein corresponding to one or more routines. An example control routine is described herein with regard to FIG. 3.

Figure 2:
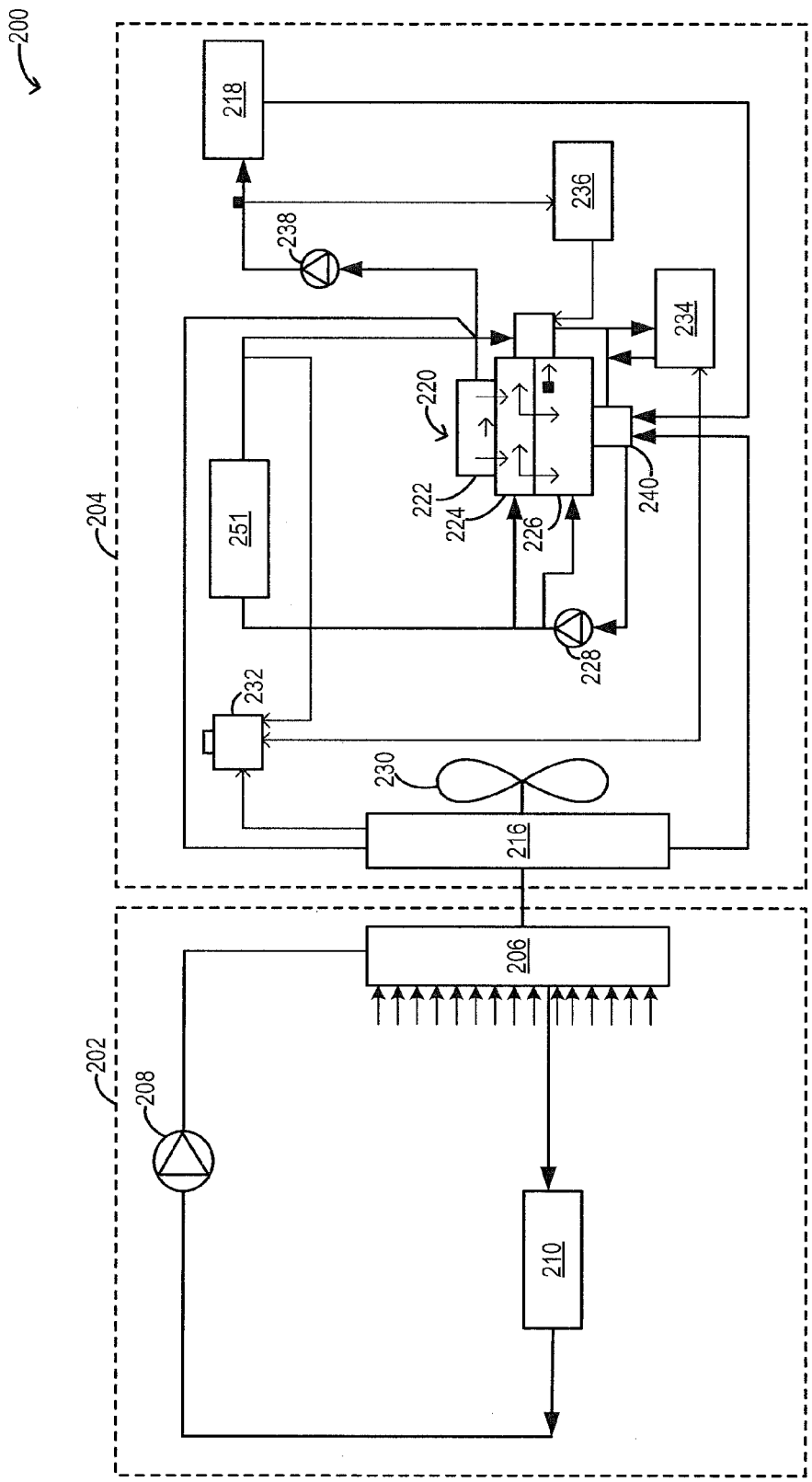
FIG. 2 shows an example embodiment of a cooling circuit coupled to the engine system of FIG. 1.

Now turning to FIG. 2, an example cooling system 200 coupled to the engine of FIG. 1 is shown. As such, the engine may be coupled to a passenger vehicle or other road vehicle. The cooling system enables exhaust heat recovered from compression heating to be passed on to a CAC so as to expedite engine heating. Specifically, flow of intake aircharge through the warmed compressor heats the intake air which is retained in the system via turning off the coolant pump.

Cooling system 200 includes a first cooling circuit 202 and a second cooling circuit 204, each coupled to different sets of engine system components. First cooling circuit 202 includes a low temperature radiator 206, coolant pump 208, and a water-air charge air cooler (CAC) 210 and constitutes a low temperature circuit. Second cooling circuit 204 includes high temperature radiator 216, coolant pumps 228, 238, EGR cooler 251, oil cooler 234, turbocharger 236, heater core 218 and constitutes a high temperature circuit.

Returning to first cooling circuit 202, coolant pump 208 is configured to pump hot coolant received from CAC 210 into radiator 206 so that heat can be rejected to the environment. Specifically, ambient air (depicted by small arrows entering radiator 206) may flow through radiator 206, picking up heat rejected at the radiator. CAC 210 may be configured to cool compressed intake aircharge received from a compressor before the aircharge is delivered to the engine intake. During boosted engine operation, intake air compressed at a compressor is delivered to the engine upon passage through the CAC (such as CAC 18 of FIG. 1). Heat from the air is rejected into coolant flowing the CAC.

As elaborated herein, during cold CAC conditions, coolant pump 208 may not be operated and coolant may stagnate in first cooling circuit 202. During such conditions, wastegate closing may be used to increase compressive heating of the intake aircharge while CRV opening may be used to increase recirculation of heated aircharge across the compressor. The combined approach increases the amount of heat rejected at CAC 210, leading to a rise in CAC temperature. As such, when the CAC temperature is above a first, lower threshold, EGR may be delivered to a pre-compressor location with reduced risk of CAC condensation. However, when the CAC temperature is above a second, higher threshold, coolant pump 208 may be operated to circulate hot coolant through radiator 206, enabling temperature control of the CAC. In one example, first cooling circuit 202 may constitute of a low temperature cooling circuit due to the lower heat rejection capacity of the circuit.

Second cooling circuit 204 is a traditional coolant loop and circulates coolant through internal combustion engine 220 to absorb waste engine heat and distribute the heated coolant to radiator 216 and/or heater core 218. Radiator 216 may include a radiator fan 230 to improve the efficiency of cooling. The second cooling circuit also circulates coolant through EGR cooler 251 coupled to the EGR system (of FIG. 1). Specifically, exhaust heat is rejected at EGR cooler 251 during EGR delivery. The second cooling circuit also circulates coolant through and receives heat rejected from engine oil cooler 234 and turbocharger 230.

Engine-driven water pump 228 circulates coolant through passages in engine 220, specifically, through the intake and exhaust manifolds 222, through engine head 224 and then through engine block 226 to absorb engine heat. From the engine, coolant flows back to the engine upon passage through EGR cooler 251 and radiator 216. Heat is transferred via radiator 216 and fan 230 to ambient air. Thus, during conditions when EGR is delivered, heat rejected at EGR cooler 251 can be circulated through engine 220 and advantageously used to warm the engine, such as during cold ambient conditions. Engine-driven water pump 228 may be coupled to the engine via a front end accessory drive (FEAD, not shown), and rotated in proportion with engine speed via a belt, chain, etc. In one example, where pump 228 is a centrifugal pump, the pressure (and resulting flow) produced may be proportional to the crankshaft speed, which in the example of FIG. 2, is directly proportional to engine speed. An auxiliary electric pump 238 may also be included in second cooling circuit 204 to assist coolant flow through the EGR system and the turbocharger. The temperature of the coolant may be regulated by a thermostat valve 240 which may be kept closed until the coolant reaches a threshold temperature.

Fan 230 may be coupled to radiator 216 in order to maintain an airflow through radiator 216 when the vehicle is moving slowly or stopped while the engine is running. In some examples, fan speed may be controlled by a controller. Alternatively, fan 230 may be coupled to engine-driven water pump 228.

Hot coolant may also flow to heater core 218 via an auxiliary pump 238. Auxiliary pump 238 may be employed to circulate coolant through heater core 218 during occasions when engine 220 is off (e.g., electric only operation) and/or to assist engine-driven pump 228 when the engine is running. Like engine-driven pump 228, the auxiliary pump may be a centrifugal pump; however, the pressure (and resulting flow) produced by the auxiliary pump may be proportional to an amount of power supplied to the pump by a system energy storage device (not shown).

At the heater core, heat may be transferred to a vehicle passenger compartment. The coolant then flows back to engine 10. Heater core 218 may thus act as a heat exchanger between the coolant and the passenger compartment. Fins may be attached to the heater core to increase the surface area for heat transfer. Air may be forced past the fins, for example by operating a fan, to expedite heating of the passenger compartment. Degas bottle 232 is located at a high point in cooling circuit 204 and is configured to purge air from the coolant. It will be appreciated that in the embodiment of FIG. 2, the smaller hoses of the cooling circuit are depicted by the thinner lines while the larger hoses are indicated by the thicker lines.

Figure 3:
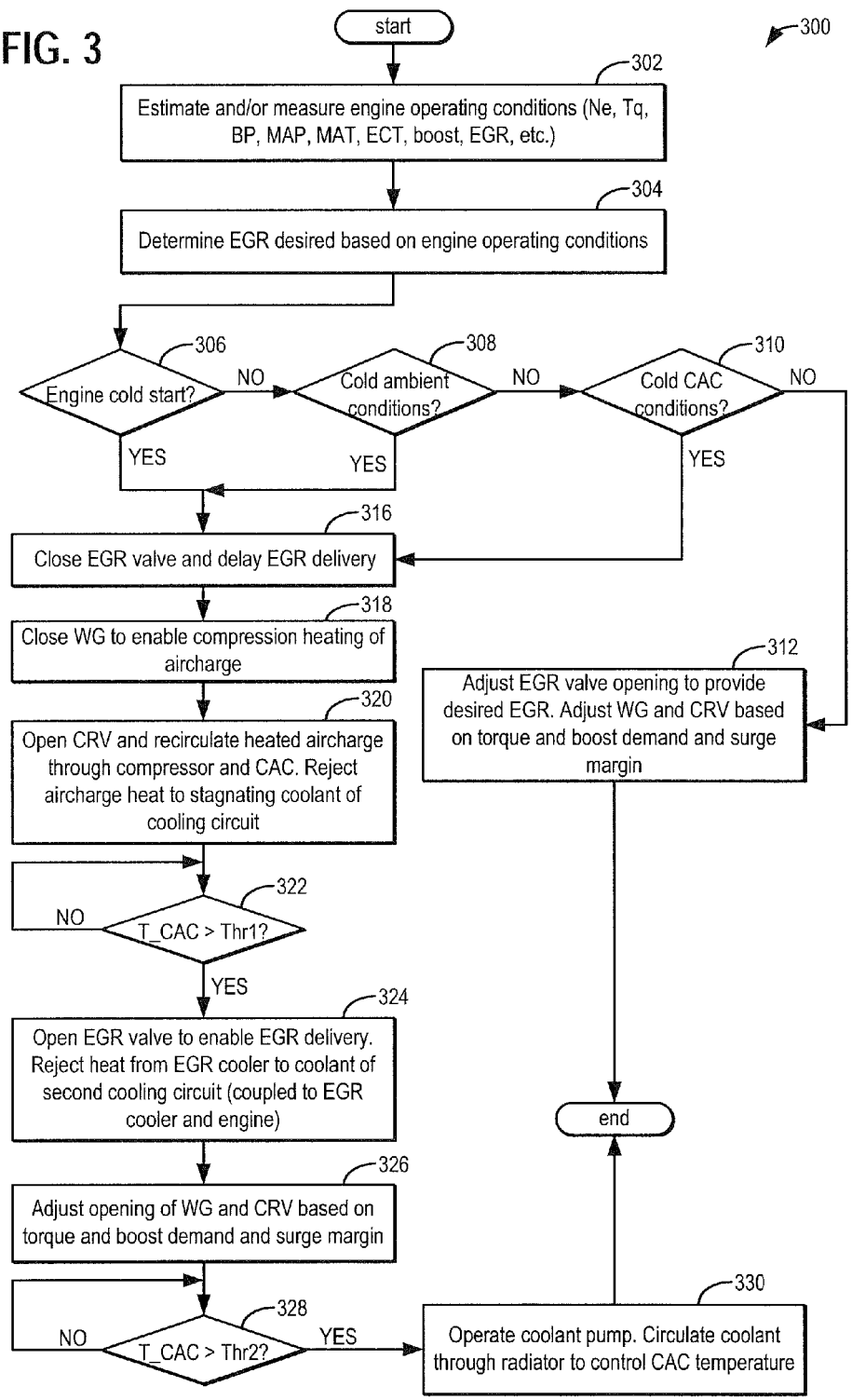
FIG. 3 shows a high level flow chart illustrating a routine that may be implemented for using compression heating to expedite CAC warm-up and cooled EGR delivery.

Now turning to FIG. 3, an example method 300 for using compression heating to heat an engine air intake aircharge, and thereby a charge air cooler and an engine, during cold conditions is shown. By recovering exhaust heat and using it to expedite warming of the CAC, EGR benefits can be delivered even during cold ambient conditions.

At 302, the routine includes estimating and/or measuring engine operating conditions such as engine speed, engine coolant temperature, barometric pressure, ambient temperature and humidity, MAP, MAF, MAT, torque demand, etc. At 304, an amount of EGR required is determined based on the estimated engine operating conditions. For example, based on the current conditions, an amount of engine dilution required may be determined and an amount of EGR corresponding to the desired engine dilution may be calculated.

EGR has a relatively large water content. As a result, the addition of low pressure EGR (LP-EGR) to the engine intake at a pre-compressor location increases the risk of condensation at both a compressor inlet as well as a charge air cooler outlet. Specifically, under cold ambient conditions, when the humid EGR is mixed with cold ambient air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events. Further still, NVH issues are possible. As elaborated below, the delivery of EGR may be delayed during cold conditions (e.g., cold ambient conditions, cold engine conditions, or cold CAC conditions) until the CAC has been sufficiently warmed to reduce the risk of condensation. At the same time, compression heating with recirculation through the compressor bypass may be advantageously used to expedite warm-up of the CAC, turbocharger housing, and engine. This allows EGR to be delivered earlier, and even during cold conditions where recirculation can be used to raise turbocharger inlet temperature above the ambient temperature.

After determining the amount of EGR desired, the routine proceeds to 306-310 to determine if cold conditions are present. As elaborated herein, the cold conditions include one or more of cold ambient conditions (e.g., where ambient temperature is below a threshold), cold engine conditions (e.g., where engine coolant temperature is below a threshold), and cold CAC conditions (e.g., where CAC temperature is below a threshold).

Specifically, at 306, it may be determined if an engine cold-start condition is present. An engine cold-start may be confirmed if the engine coolant temperature is below a threshold, or if an exhaust catalyst temperature is below a light-off temperature. If an engine cold start is not confirmed, at 308, it may be determined if cold ambient conditions are present. If cold ambient conditions are not present, it may be determined if cold CAC conditions are present at 310. As such, during the cold ambient conditions and the cold CAC conditions, it may be determined if the temperature (ambient or CAC) is below a threshold and/or if the temperature has been below the threshold for a duration.

If cold conditions (that is, cold ambient conditions, cold CAC conditions, or cold-start conditions) are not confirmed at 306-310, then at 312, the routine includes enabling EGR delivery. Specifically, an opening of an EGR valve in the low pressure EGR passage may be adjusted to provide the desired EGR amount (as was previously determined at 304). In one example, where the EGR valve is a continuously variable valve, this may include increasing an opening of the EGR valve as the desired EGR amount increases. In an alternate example, where the EGR valve is an on/off valve, the EGR valve may be shifted to an open or on position to enable EGR delivery. Also at 312, the opening of one or more of an exhaust wastegate and an intake CRV may be adjusted based on the EGR delivered to meet the torque and boost demand, as well as desired surge margin. For example, as the EGR delivered increases, an opening of the wastegate may be modulated (e.g., increased) and an opening of the CRV may be decreased to enable peak engine performance.

If any of the cold conditions is confirmed, the routine proceeds to 316 to close the EGR valve (or hold the EGR valve closed) and delay EGR delivery until sufficient CAC warming has occurred. As such, closing the EGR valve includes providing no exhaust gas recirculation.

At 318, the routine includes closing the wastegate while holding the EGR valve closed. As such, by closing the wastegate, compression heating of intake aircharge is enabled. Specifically, the charge pressure (and thereby the charge temperature) upstream of the turbine is increased which in turn increases the temperature of charge downstream of the CAC. This results in compressive heating of the intake aircharge. At 320, while closing the wastegate and the EGR valve, the routine includes opening the CRV to heat the CAC coupled downstream of the intake compressor. Opening the CRV includes recirculating compressed air from downstream of the CAC and upstream of an intake throttle to the compressor inlet via the CRV. By simultaneously opening the CRV while closing the wastegate, the heated aircharge can be recirculated around the compressor and the CAC, thereby warming the CAC. In addition, by increasing the recirculation of heated air across the CAC (via the CRV), heat transfer to the CAC and the CAC cooling circuit is increased without incurring a substantial increase in throttle inlet pressure.

Essentially, exhaust heat is recovered at the turbine and rejected into the CAC cooling circuit (such as cooling circuit 202 of FIG. 2) to expedite warming of the CAC. As such, while exhaust heat is rejected into the cooling circuit, a coolant pump of the circuit may not be operated and heat may be rejected to stagnant coolant. Then, once the CAC has sufficiently warmed, the coolant pump may be operated to circulate or flow coolant through a radiator to enable temperature control of the CAC. For example, the pump may be operated and coolant may be passed through the radiator to lose CAC heat so as to maintain the CAC at or around a threshold temperature (e.g., at or around 25-30° C.).

Returning to FIG. 3, compressive heating of the intake aircharge may be continued until the CAC has been sufficiently warmed. Specifically, the wastegate and the EGR valve may be kept closed and the CRV may be managed (e.g., kept open for a duration) until a compressor temperature is above a threshold temperature. In an alternate example, when boost is required, the CRV may be closed to increase boost pressure. The compressor temperature may include a compressor inlet temperature, a compressor outlet temperature, and/or a charge air cooler temperature (of the CAC located downstream of the compressor). In one example, a temperature sensor may be coupled to the cooling circuit upstream of the CAC to estimate a compressor temperature. Alternatively, a temperature sensor may be coupled to the CAC inlet or outlet to estimate a compressor temperature.

The indirect heating of the engine coolant as well the direct heating of the intake aircharge via the compressive heating can also improve the performance of a system heater as well as cold start exhaust emissions. In particular, hydrocarbon or soot emissions may be reduced with warm intake air relative to colder ambient air.

In the depicted example, at 322, it may be determined if the charge air cooler temperature (T_CAC) is higher than a threshold temperature (Thr1). If not, the wastegate and EGR valve may be maintained closed. The threshold temperature may be based on one or more of ambient humidity and ambient temperature. For example, as the ambient humidity increases, the threshold temperature may be increased. The threshold temperature may be further based on a coolant temperature of the first cooling circuit coupled to the CAC. In one example, the threshold temperature is 25° C.

Once the CAC has been sufficiently warmed (e.g., after the duration), at 324, the routine includes opening the EGR valve to enable LP-EGR and recirculating exhaust gas from downstream of the exhaust turbine to the compressor inlet via an EGR passage and an EGR cooler positioned upstream of the EGR valve. The opening of the EGR valve may be adjusted based on the EGR amount or flow rate desired. As such, once EGR is enabled, heat is rejected from the EGR cooler to a second, different cooling circuit. The second cooling circuit may be coupled to the EGR cooler and further coupled to the engine but not coupled to the CAC (such as cooling circuit 204 of FIG. 2). This heat rejection allows engine temperatures to be further increased during engine cold starts.

At 326, the routine includes adjusting an opening of the wastegate and the CRV based on the torque and boost demand, as well as desired surge margin. For example, while opening the EGR valve, the wastegate may be opened with an opening of the wastegate adjusted and coordinated with the compressor recirculation flow to provide a boost pressure based on operator torque demand. In this way, delivery of low pressure EGR may be delayed based on charge air cooler conditions, specifically, based on charge air cooler temperature relative to a threshold.

As such, while the CAC is warming up, but before the CAC is hot, coolant may be stagnant in the first cooling circuit. Then, once the CAC is hot, coolant may be circulated through the first cooling circuit by operating a pump of the first cooling circuit. Specifically, at 328, it may be determined if the CAC temperature (T_CAC) is above a second threshold temperature (Thr2) higher than the first threshold temperature (Thr1). If yes, then at 330, the coolant pump may be operated and coolant may be flowed through the first CAC cooling circuit. Coolant may then be circulated through the CAC and excess heat may be rejected to the atmosphere upon passing through a radiator. This allows a temperature of the CAC to be maintained.

It will be appreciated that while closing the wastegate to heat the CAC can increase engine pumping losses, by enabling EGR earlier (as compared to an engine cold start where the wastegate is not closed and the CAC is not warmed using compressive heating), the overall engine fuel economy is improved. Higher intake MAP (from the heated intake aircharge which requires less throttling for a given air mass) can also reduce intake pumping work and provide additional offset to the exhaust pumping penalty.

In this way, heat is added to a CAC cooling circuit and compressor inlet via energy recovered from the exhaust with the turbine. With the wastegate closed, energy is recovered from the exhaust and transferred via the compressor to the inlet air. By adding heat to coolant stagnating in the first cooling circuit, a temperature at the CAC can be rapidly raised, allowing for EGR to be scheduled earlier (as compared to engine cold-starts where the wastegate is open). As such, this extends EGR benefits over a wider range of engine operating conditions. An example use of compressive heating for warming a CAC depicted herein with reference to FIG. 4.

In one example, a method for a boosted engine comprises delaying recirculation of exhaust gas from downstream of a turbine to a compressor inlet until a charge air cooler temperature is higher than a first threshold. The delaying includes, during cold ambient conditions, maintaining an EGR valve closed until the charge air cooler temperature is higher than the first threshold. The method further comprises, while maintaining the EGR valve closed, closing a wastegate coupled across an exhaust turbine and opening a compressor recirculation valve coupled across a compressor to heat the charge air cooler by increasing recirculation of heated aircharge across the charge air cooler, the compressor recirculation valve positioned in a passage coupling an outlet of the charge air cooler to the compressor inlet. Herein increasing recirculation of heated aircharge across the charge air cooler includes not operating a coolant pump and rejecting exhaust heat into coolant stagnating in a cooling circuit coupled to the charge air cooler. In response to charge air cooler temperature being above the first threshold, the method includes opening the EGR valve to enable recirculation of exhaust gas while increasing an opening of the wastegate and decreasing an opening of the compressor recirculation valve. In response to charge air cooler temperature being above a second threshold, higher than the first threshold, a coolant is operated and coolant is circulated through a radiator until the charge air cooler temperature is below the second threshold.

Figure 4:
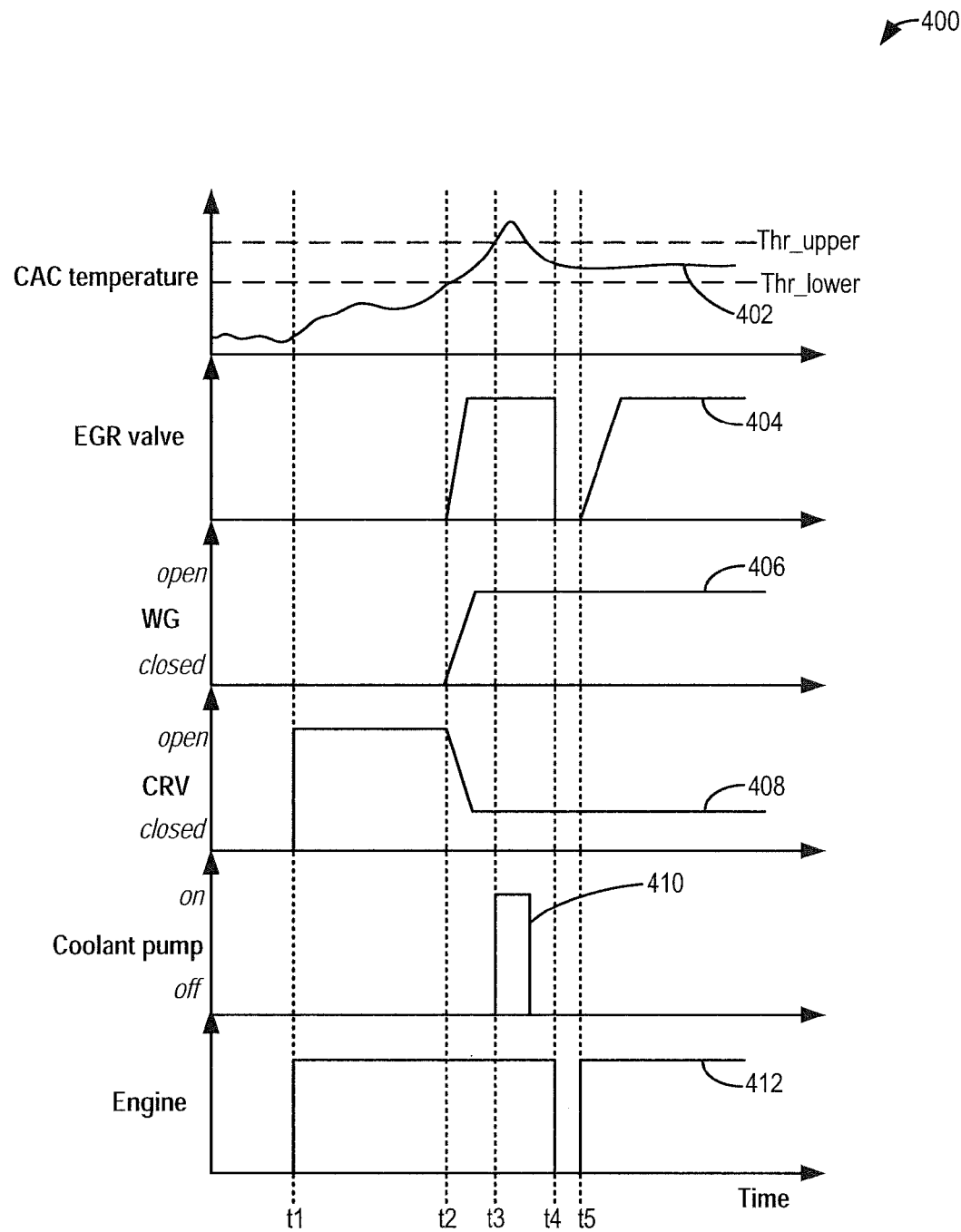
FIG. 4 shows an example adjustment used for CAC temperature control, according to the present disclosure.

Now turning to FIG. 4, map 400 depicts an example use of compressor heating for warming up a CAC. Map 400 depicts CAC temperature at plot 402, EGR valve position at plot 404, wastegate position at plot 406, CRV position at plot 408, coolant pump operation at plot 410, and engine operation at plot 412.

Prior to t1, the engine may be shutdown. At t1, an engine cold-start may be confirmed (plot 412). During the cold-start, CAC temperature (plot 402) may be below a lower threshold (Thr_lower) and introduction of any EGR during these conditions may lead to condensation and related issues. Thus, at t1, during the engine cold-start, EGR may be disabled by starting the engine with the EGR valve closed (plot 404). In addition, CAC heating may be expedited by starting the engine with the wastegate (plot 406) closed. By closing the EGR valve, EGR delivery is delayed until CAC conditions are sufficiently warm. By closing the wastegate, exhaust heat can be recovered and used to heat the intake aircharge. Specifically, compressive heating of the intake aircharge can be enabled.

Also at t1, the CRV may be opened. For example, the CRV may be fully or at least partially opened. By opening the CRV, the heated intake aircharge can be recirculated across the CAC causing additional warming of the CAC. As such, during the compressive heating of the cold CAC, the coolant pump is not operated (plot 410) and heat recovered from the exhaust is rejected into coolant stagnating in a first cooling circuit coupled to the CAC. This allows a temperature of coolant circulating at the CAC to be raised. In addition, the heated intake aircharge expedites warming of the engine during the cold-start.

Compressive heating of the intake aircharge and CAC may be continued for a duration between t1 and t2 until the CAC temperature is above Thr_lower. In one example, Thr_lower may be based on ambient conditions such as ambient temperature and humidity. In another example, Thr_lower may be a predefined value, such as 25-30° C.

At t2, in response to CAC temperature being at or above Thr_lower, EGR delivery may be enabled by increasing an opening of the EGR valve (plot 404). As such, the EGR valve opening and EGR flow rate provided may be based on engine operating conditions to provide a required amount of engine dilution. As EGR delivery is initiated, heat may be rejected from the EGR cooler into a second cooling circuit coupled to the EGR cooler and the engine, but not coupled to the CAC. This allows engine temperatures to be raised during the cold-start, improving engine performance and fuel economy. Also at t2, the wastegate may be opened and an opening of the CRV may be reduced. Herein, the wastegate and CRV adjustments may be based on torque and boost demand, as well as surge margin, and further based on EGR amounts, so as to allow peak boosted engine performance to be provided.

At t3, the CAC temperature may temporarily rise above an upper threshold temperature (Thr_upper) and temperature control of the CAC may be initiated. The upper threshold temperature may be higher than the lower threshold temperature. Specifically, in response to elevated CAC temperatures, the coolant pump may be operated (plot 404) and hot coolant may be circulated through a radiator coupled to the first cooling circuit. The coolant pump may be operated for a duration since t3 until the CAC temperature is returned below Thr_upper (and above Thr_lower).

At t4, the engine may be shutdown in response to engine shutdown conditions. During the shutdown conditions, the EGR valve may be held closed while the wastegate may be left open. The CRV position may also be held.

At t5, the engine may be restarted in response to engine restart conditions. However, due to the short duration elapsed since the previous shutdown, the engine restart at t5 may constitute an engine hot start where the CAC is already sufficiently warm (that is, CAC temperature is above Thr_lower). In response to the hot start condition, at t5, the engine may be started with the wastegate open and the CRV closed (or only partially open). Additionally, EGR delivery may be initiated during the hot start without a delay by opening the EGR valve.

It will be appreciated that while the example of FIG. 4 depicts delaying EGR delivery until the CAC is warmed, the overall EGR schedule is enabled earlier in an engine cycle relative to an engine cycle where the engine is started with the wastegate open. Specifically, the compressive heating allows for EGR to be scheduled earlier in an engine cycle by expediting CAC heating.

In one example, a vehicle system comprises an engine including an intake throttle, a turbocharger including an intake compressor and an exhaust turbine, a charge air cooler coupled downstream of the compressor and upstream of the throttle, a compressor recirculation valve in a bypass coupling a charge air cooler outlet to a compressor inlet, a wastegate coupled across the turbine and an EGR system including an upstream EGR cooler and a downstream EGR valve positioned in an EGR passage coupling an outlet of the turbine to the compressor inlet. The engine system may further include a controller with computer-readable instructions for, during an engine cold-start, compressive heating the charge air cooler by starting the engine with each of the wastegate and EGR valve closed and the compressor recirculation valve open, and opening the EGR valve after a temperature of the charge air cooler is above a threshold. In comparison, during an engine hot start, the controller may start the engine with each of the wastegate and EGR valve open and the compressor recirculation valve closed.

In this way, during cold conditions, CAC heating can be expedited by forcing a wastegate closed and using compressive heating to warm intake aircharge flowing through the CAC. By concurrently opening a CRV, increased recirculation of heated aircharge across the compressor can be used to further expedite CAC heating. By expediting warming of the CAC, and coordinating EGR delivery based on the CAC warming, EGR can be introduced with a reduced propensity for post-CAC condensation. As such, this allows EGR benefits to be attained even during cold ambient conditions and extends the EGR benefits over a wider range of engine operating conditions. By reducing the risk of condensation, misfires and related NVH issues can be reduced. Overall, engine performance during cold conditions is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
responsive to cold conditions, closing a wastegate and an EGR valve while opening a compressor recirculation valve to heat a charge air cooler coupled downstream of a compressor for a duration until a compressor temperature is above a threshold temperature, the threshold temperature based on a coolant temperature of a first cooling circuit coupled to the charge air cooler.

2. The method of claim 1, wherein the cold conditions include one or more of cold ambient conditions with ambient temperature below a threshold, cold engine conditions with engine coolant temperature below a threshold, and cold charge air cooler conditions with cooler temperature below a threshold.

3. The method of claim 1, wherein the compressor temperature includes one of a charge air cooler inlet temperature, a charge air cooler outlet temperature, and a compressor inlet temperature.

4. The method of claim 1, wherein the threshold temperature is further based on one or more of ambient humidity and ambient temperature.

5. The method of claim 1, wherein opening the compressor recirculation valve includes recirculating compressed air from downstream of the charge air cooler and upstream of an intake throttle to a compressor inlet via the compressor recirculation valve.

6. The method of claim 1, wherein closing the EGR valve includes providing no exhaust gas recirculation.

7. The method of claim 1, further comprising, after the duration, opening the EGR valve to recirculate exhaust gas from downstream of a turbine to a compressor inlet via an EGR passage and an EGR cooler coupled upstream of the EGR valve.

8. The method of claim 7, wherein recirculating exhaust gas via the EGR cooler includes rejecting heat to a second, different cooling circuit coupled to the EGR cooler and further coupled to the engine, the second cooling circuit not coupled to the charge air cooler.

9. The method of claim 8, further comprising, while opening the EGR valve, opening the wastegate, the wastegate opening adjusted to provide a boost pressure based on operator torque demand.

10. The method of claim 1, wherein the charge air cooler is a water-cooled charge air cooler.

11. A method for a boosted engine, comprising:
delaying recirculation of exhaust gas from downstream of a turbine to a compressor inlet until a charge air cooler temperature is higher than a first threshold; and
while the temperature is below the first threshold,
closing an exhaust wastegate;
opening a compressor recirculation valve;
not operating a coolant pump; and
rejecting exhaust heat into coolant stagnating in a cooling circuit coupled to the charge air cooler.

12. The method of claim 11, wherein the delaying includes, during cold ambient conditions, maintaining an EGR valve closed until the charge air cooler temperature is higher than the first threshold.

13. The method of claim 11, wherein closing the exhaust wastegate includes closing the wastegate coupled across an exhaust turbine to heat intake aircharge, and wherein opening the compressor recirculation valve includes opening the compressor recirculation valve coupled across a compressor to increase recirculation of the heated intake aircharge across the charge air cooler, the compressor recirculation valve positioned in a passage coupling an outlet of the charge air cooler to the compressor inlet.

14. The method of claim 12, further comprising, in response to charge air cooler temperature being above the first threshold, opening the EGR valve to enable recirculation of exhaust gas while increasing an opening of the wastegate and decreasing an opening of the compressor recirculation valve.

15. The method of claim 14, further comprising, in response to charge air cooler temperature being above a second threshold, higher than the first threshold, operating the coolant pump and circulating hot coolant through a radiator until the charge air cooler temperature is below the second threshold.

16. A vehicle system, comprising:
an engine including an intake throttle;
a turbocharger including an intake compressor and an exhaust turbine;
a charge air cooler coupled downstream of the compressor and upstream of the throttle;
a compressor recirculation valve in a bypass coupling a charge air cooler outlet to a compressor inlet;
a wastegate coupled across the turbine;
an EGR system including an upstream EGR cooler and a downstream EGR valve positioned in an EGR passage coupling an outlet of the turbine to the compressor inlet;
a controller with computer-readable instructions for:
during an engine cold-start,
compressive heating the charge air cooler by starting the engine with each of the wastegate and EGR valve closed and the compressor recirculation valve open; and
opening the EGR valve after a temperature of the charge air cooler is above a threshold.

17. The system of claim 16, wherein the controller includes further instructions for,
during an engine hot start,
starting the engine with each of the wastegate and EGR valve open and the compressor recirculation valve closed.

* * * * *